United States Patent [19]

Sauvageot et al.

[11] Patent Number: 4,934,761
[45] Date of Patent: Jun. 19, 1990

[54] PRESSURE-GENERATING DEVICE FOR BRAKING CIRCUITS OF MOTOR VEHICLES

[75] Inventors: Jean-Claude Sauvageot, Rueil-Malmaison; Didier Merletti, Les-Clayes-Sous-Bois; Jean-Francois Louviot, Sevres, all of France

[73] Assignee: Regie Nationale des Usines Renault, Boulogne Billancourt, France

[21] Appl. No.: 316,423

[22] Filed: Feb. 23, 1989

[51] Int. Cl.$^5$ ............................................. B60T 8/58
[52] U.S. Cl. ..................................... 303/93; 188/162; 303/116
[58] Field of Search ................. 188/156, 158, 162; 303/93, 95, 100, 110, 111, 116

[56] References Cited

U.S. PATENT DOCUMENTS

| | | | |
|---|---|---|---|
| 4,327,414 | 4/1982 | Klein | 303/93 X |
| 4,435,021 | 3/1984 | Hoenick | 303/93 X |
| 4,629,039 | 12/1986 | Imoto et al. | 188/158 X |
| 4,658,939 | 4/1987 | Kircher et al. | 188/156 |

*Primary Examiner*—Duane A. Reger
*Attorney, Agent, or Firm*—Oblon, Spivak, McClelland, Maier & Neustadt

[57] ABSTRACT

Pressure-generating device for braking circuits of motor vehicles of the type having electric motors for controlling a device for generating braking pressure. Electric motors (15), associated with each wheel (1, 1', 2, 2') or pair of wheels (1,1'-2,2') of the same axle, drive positive displacement pumps (16) generating the braking pressure for cylinders (7) of brakes (3 to 6).

5 Claims, 3 Drawing Sheets

PRESSURE-GENERATING DEVICE FOR BRAKING CIRCUITS OF MOTOR VEHICLES

The invention relates to a pressure-generating device for braking circuits of motor vehicles of the type comprising electric motors controlling a means for generating braking pressure.

BACKGROUND OF THE INVENTION

The publication FR-A-2561189 describes a device in which each wheel brake is equipped with an electric motor connected by a mechanical transmission to the control piston of the brake.

Such a device requires the use of specific brakes that incorporate both the electric motor and mechanical transmission.

The invention has as its object a braking pressure-generating device that comprises, for a wheel or a wheel axle, an electric motor, a hydraulic pump that is driven by said motor, and that generates the braking pressure, and a device sensing a parameter related to the braking force.

SUMMARY OF THE INVENTION

According to a characteristic of the invention, the deviations between the values of the control signal of the braking action and the values of the related parameter are processed electronically for each wheel to deliver control signals to each electric motor.

The generating device thus made can comprise only a single electric motor driving a pump generating the braking pressure for the brakes of the same axle.

The device has the advantage of being able to be associated with sensors delivering signals representative of the load of the rear wheels and the load of the front wheels.

Consequently, it will be possible to achieve braking circuits without elements for limiting, correcting or distributing of the braking pressure whose design is based on an average value of the different load states of the vehicle.

The device therefore has the possibility of being able to be associated, for example, with a specific sensor such as a potentiometric movement sensor which measures the average distance between the horizontal reference plane of the vehicle and the horizontal axis defined by the centers of the rear wheels. The signal filtered by this sensor is representative of the load condition of the rear axle of the vehicle. When such a sensor is associated with an analog or digital electronic circuit, the device makes it possible to modify, as a function of the rear axle load, the distribution of the braking force between the two axles of the vehicle according to the relationships inherent in the electronics. Then, during braking, a useful adhesion rate of the available adhesion between the wheel and the ground greater than the rate of adhesion used by the standard devices for distribution of braking pressure is obtained, regardless of the load condition of the vehicle.

Another advantage of the device is being able to be associated with sensors delivering signals representative of the speed and the derivative of the speed of the wheel and vehicle to obtain the desired deceleration of the vehicle while avoiding any danger of ill-timed locking of the wheels.

In this case, the braking force on each wheel is advantageously used by a digital electronic circuit which makes possible the replacement of standard antilocking systems.

BRIEF DESCRIPTION OF THE DRAWINGS

Other characteristics and advantages of the invention will come out from the description of an embodiment of the device with reference to the accompanying drawing in which.

DETAILED DESCRIPTION OF THE PREFERRED EMBODIMENT

Figure 1:
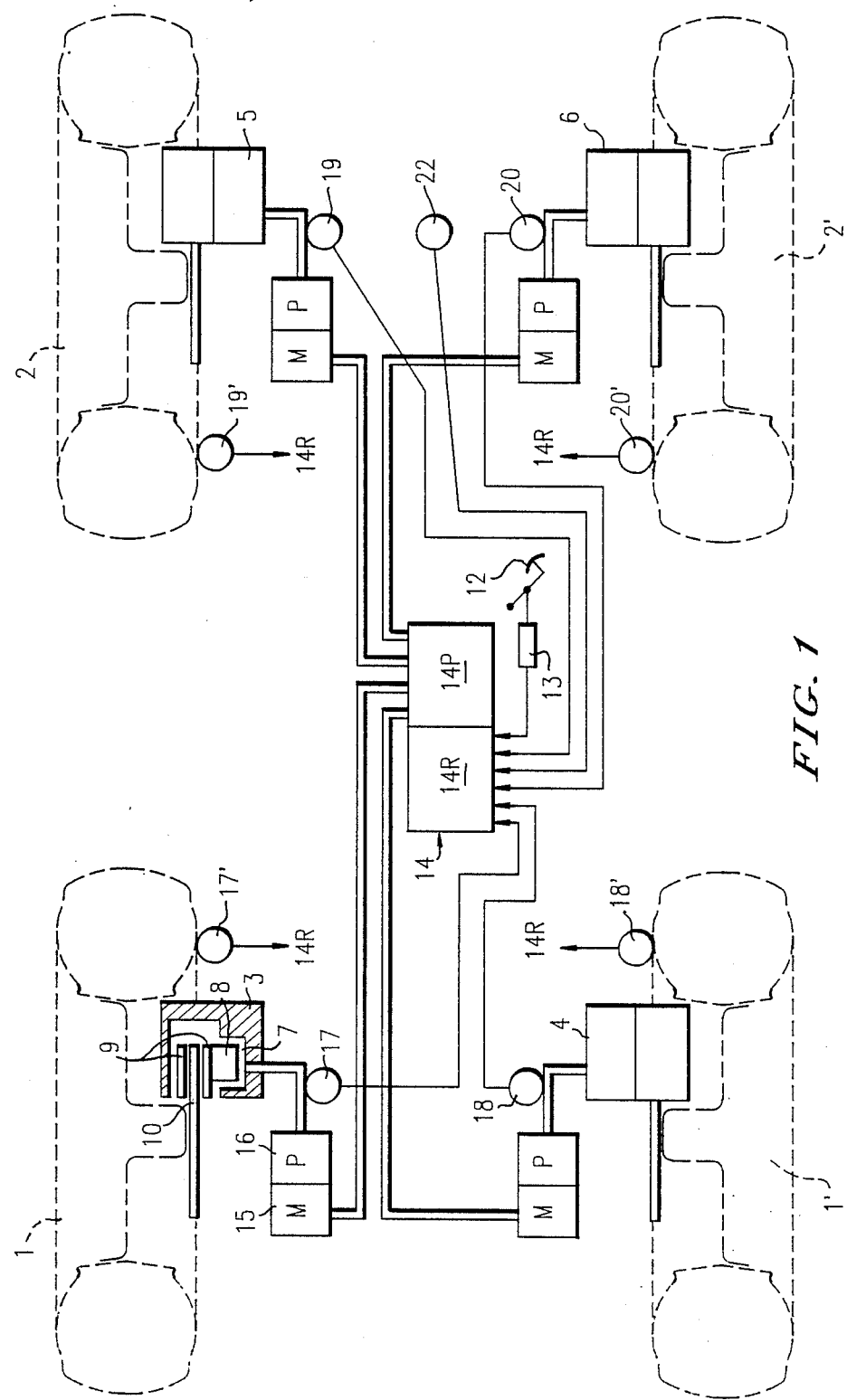
FIG. 1 is a diagrammatic representation of the device associated with various sensors.

The device is applied to a passenger vehicle each of whose front wheels 1,1' and rear wheels 2,2' is provided with a brake 3 to 6 which is has a receiving cylinder 7 in which a piston 8 that presses friction linings 9 with the necessary force against a brake track 10 turning with the wheel. FIG. 1 describes the device applied to a disk brake but is just as applicable to a drum brake. The brake of wheel 1 is represented diagrammatically for simplification. The other brakes and wheels are represented by their references.

With braking pedal 12 there is associated a sensor 13 which constitutes a measuring means which transmits a signal representative of the travel or force applied to pedal 12.

A processing circuit 14 with regulating unit 14R and power unit 14P transforms the signal of sensor 13 into control variables (voltage or current) of an A.C. or D.C. electric motor 15, with slight inertia and slight losses by friction, associated with each wheel 1,1'-2,2' or pair of wheels of the same axle. Each motor 15 drives a positive displacement pump 16 such as a gear pump whose discharge pipe is connected to receiving cylinder 7.

The delivery of fluid by pump 16 assures the displacement of piston 8 and the increase of pressure in cylinder 7.

The braking force desired by the vehicle driver is measured at the level of pedal 12 by sensor 13.

The latter, which can be made from strain gages, delivers a control signal directed to regulating unit 14R. But the regulating unit can also manage one or more parameters measured by sensors 17 to 20 delivering signals related to the braking force of each wheel. By way of example, sensors 17 to 20 might be of the type that associates strain gages with a deforming membrane constitute a pressure sensor. Further, a sensor 22 will deliver a signal representing the load of the rear axle. Also, a sensor 17' to 20', associated with each wheel, will deliver a signal representing the speed of the wheel.

In this way the set of sensors 17, 18, 19, 20, 22 delivers signals for establishing a control signal whose deviations serve to establish the voltage or current for controlling motors 15 to set the braking force of each wheel to a set point given by the driver.

The set point of the signal at the terminals of the motor or motors of the rear wheels is controlled as a function of the load.

It should be noted that processing circuit 14 can be replaced by a different electronic circuit that can be made from standard components if the antilocking control function of the vehicle wheels is eliminated. In the opposite case, processing circuit 14 may be completed by additional sensors and a computer which will replace the braking set point communicated by the driver with a set point calculated for each motor from measured signals and programmed control laws stored beforehand in the computer each time a tendency toward locking is detected.

Figure 2:
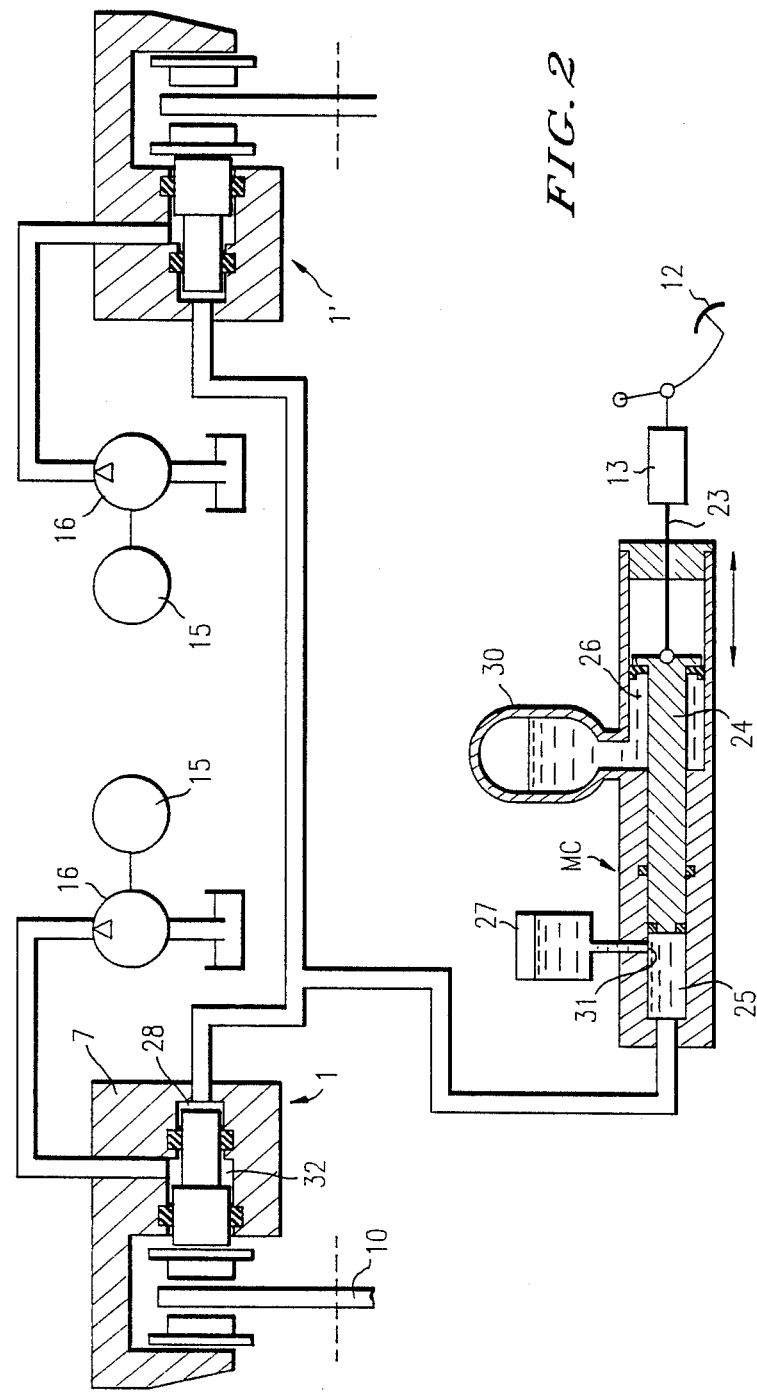
FIG. 2 is a diagrammatic representation of a variant embodiment of the device applied to an emergency braking device.

According to FIG. 2, the braking pressure generating device is applied to an emergency braking circuit in which pedal 12 and sensor 13 are associated with a thrust rod 23 whose end is coupled to a stepped piston 24 whose ends delimit two pressure chambers 25-26 of a master cylinder MC, one of which is connected to a tank 27 and pressure chamber 28 of cylinder 7 and the other of which is subjected to pressure provided by an oil-pneumatic accumulator 30. Piston 24 carries at its end a stopper of orifice 31 for connecting tank 27 with chamber 25.

When the driver actuates pedal 12, piston 24 compresses the fluid in chamber 26 and in accumulator 30. Orifice 31 is open and chambers 25 and 28 of the master cylinder and brakes are not under pressure.

The braking pressure is produced by motor pump 15-16 in a chamber 32 of the braking cylinder as a function of the signal emitted by sensor 13 which is a slave to the pedal.

Under normal operating conditions, the adjustment pressure of accumulator 30 makes it possible to obtain a force opposing the movement of pedal 12. A suitable dimensioning of the volume of the chamber of accumulator 30, of its adjustment pressure and of the volume of chamber 26 makes it possible to obtain the desired variation of the force applied to the pedal as a function of its travel.

On the other hand, when the pressure-generating device is out of order, the master cylinder provides the braking pressure directly from chamber 25 to chambers 28 of the brake cylinders.

Figure 3:
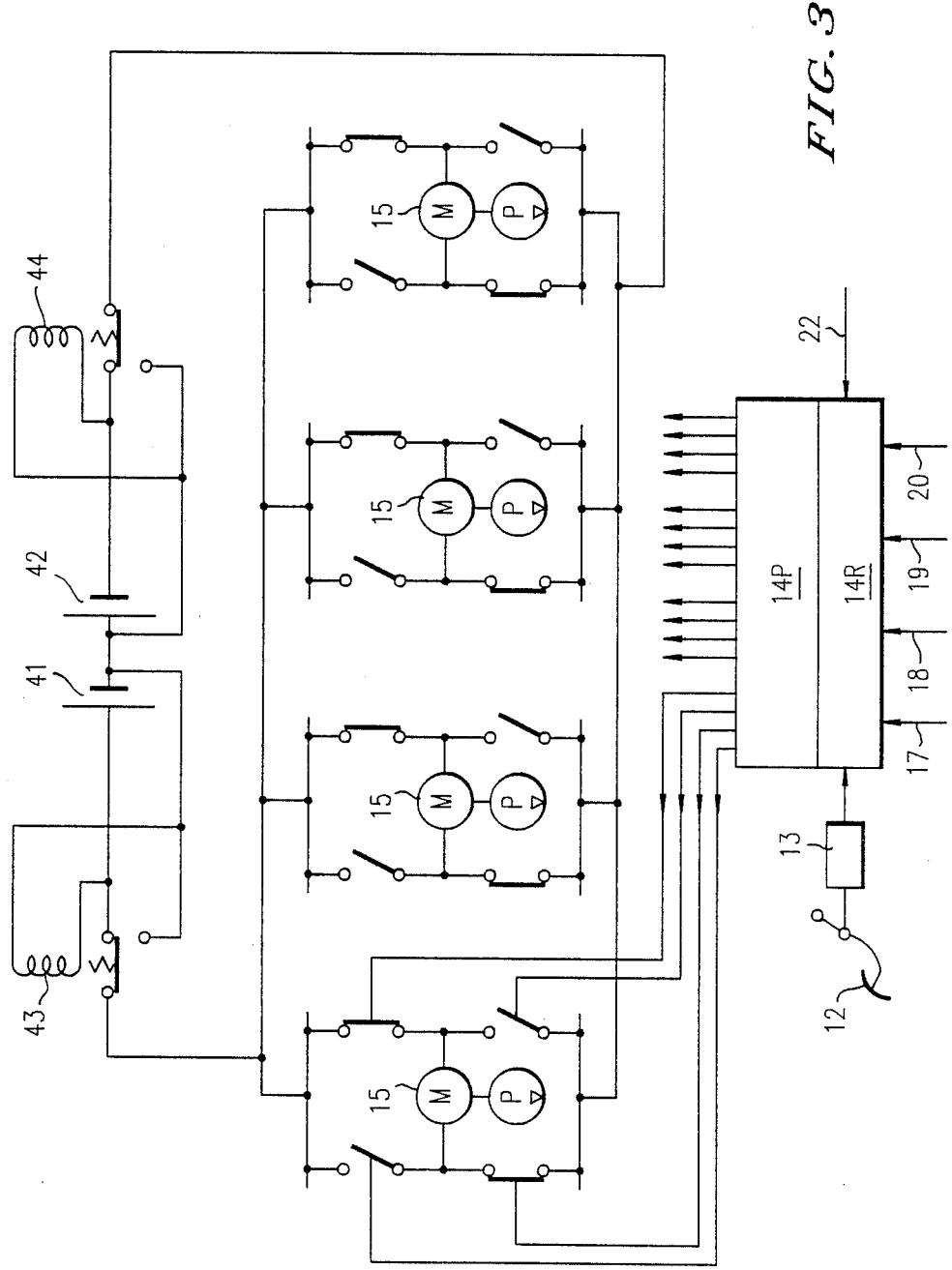
FIG. 3 is a diagrammatic representation of the mode of supplying electric motors from an emergency battery.

According to FIG. 3, DC motors 15 with permanent excitation of the braking pressure-generating device are supplied by two electric power sources 41, 42 mounted in series, each of which provides the coil voltage of a switching contact relay 43, 44 which assures supplying motors 15 by the nondefective power source(s).

Each motor 15 is supplied by a chopping regulator system with transistors which make possible the reversal of the running direction of the motor pump as a function of the control signals generated by the processing circuit.

I claim:

1. A braking pressure generating device in a motor vehicle having at least one braking means responsive to hydraulic braking pressure for braking the vehicle, comprising:
   a reversible electric motor;
   a positive displacement pump driven by said motor and connected to said braking means for supplying hydraulic braking pressure to said braking means in proportion to the displacement of said pump; and
   regulating means responsive to a braking signal for controlling the reversible rotation of said electric motor such that the hydraulic braking pressure is controlled.

2. The device of claim 1 wherein said regulating means is responsive to a braking signal from a driver and vehicle driving condition signal.

3. The device of claim 2 wherein said vehicle driving condition signal is at least one of a rear axle load signal and a wheel speed signal.

4. The device of claims 1 or 2 or 3 including a brake master cylinder, wherein said braking means comprises a slave cylinder having a piston movable for braking the vehicle and defining:
   a first pressure chamber to which said positive displacement pump is connected; and
   a second pressure chamber independent of said first pressure chamber and connected to said brake master cylinder, whereby said braking means may be independently actuated by said master cylinder.

5. The device according to claims 1 or 2 or 3 including two electrical power sources, each connected to said electric motor via a separate switching contact relay.

* * * * *